United States Patent Office
3,769,306
Patented Oct. 30, 1973

3,769,306
PROCESS FOR PREPARING 3-OXYGENATED-
ESTRA - 1,3,5(10),8,14 - PENTAENE-17-ONE
COMPOUNDS
Chan Hwa Kuo, South Plainfield, David Taub, Metuchen, and Norman L. Wendler, Summit, N.J., assignors to Merck & Co., Inc., Rahway, N.J.
No Drawing. Continuation of application Ser. No. 502,523, Oct. 22, 1965, which is a continuation-in-part of application Ser. No. 455,992, May 14, 1965, both now abandoned. This application Mar. 16, 1970, Ser. No. 24,434
Int. Cl. C07c 169/52
U.S. Cl. 260—397.1        8 Claims

ABSTRACT OF THE DISCLOSURE

The invention disclosed herein relates generally to a novel method for the preparation of intermediate compounds useful in preparing steroid compounds of the estrane series which have utility as intermediates in the preparation of 3-hydroxy or substituted oxy-gona- or D-homogona-1,3,5(10)-trien-17-one or 17a-one steroids which may have a lower alkyl substituent on the 13-carbon atom. These compounds are prepared for example by condensing carbalkoxy - 2 - alkyl - cyclopentane-1,3-dione with 1-vinyl-1-methoxy-6-hydroxy-1,2,3,4-tetrahydronaphthalene to form 3-methoxy-8,14-secogona-1,3,5(10),9-(11)-tetraene-14,17-dione, which is then converted by reaction with acid to 3-methoxy-15-carbalkoxy-13-alkyl-1,3,5(10),8,14-pentaene-17-one; hydrogenation followed by basic saponification of the ester at C-15 and decarboxylation of the resulting 15-carboxylic acid by heating with acid produces the corresponding 3-methoxy-3-alkyl-1,3,5-(10)-triene-17-one such as estrone methyl ether. The latter compounds are physiologically active substances possessing estrogenic activity, and also have utility as intermediates for the total synthesis of 19-nor steroids.

The present application is a continuation of application Ser. No. 502,523 filed Oct. 2, 1965 and now abandoned, which is a continuation-in-part of U.S. patent application Ser. No. 455,992 filed May 14, 1965 and now abandoned.

More particularly, this invention relates to a reaction between a 1-vinyl-1-hydroxy-6-hydroxy or substituted oxy-1,2,3,4-tetrahydronaphthalene (Compound I) and cycloaliphatic-1,3-diones, such as cyclopentane-1,3-dione, cyclohexane-1,3-dione, 2-lower alkylcyclohexane-1,3-dione, 2-lower alkyl-4-bromocyclopentane-1,3-dione, 2-lower alkyl-4-carboxamido, carbalkoxy or carbaralkoxycyclopentane-1,3-dione and 2-lower alkyl-4-acyloxycyclopentane-1,3-dione (Compound II) to provide a 3-hydroxy or substituted oxy-8,14-secogona- or D-homogona-1,3,5(10),9-(11)-tetraene-14,17- or 14,17a-dione, 3-hydroxy or substituted oxy-8,14-seco-13-lower alkylgona- or D-homogona-1,3,5(10), 9(11)-tetraene-14,17- or 14,17a-dione, 3-hydroxy or substituted oxy-8,14-seco-13-lower alkyl-15-carbalkoxy, carbaralkoxy or carboxamido-gona-1,3,5(10), 9(11)-tetraene-14,17-dione, or a 3-hydroxy or substituted oxy-8,14-seco-13-lower alkylgona-1,3,5(10),9(11),15-pentaene-14,17-dione (Compound III), and also to provide by a one-step method a 3-hydroxy or substituted oxygona-1,3,5(10),8,14-pentaen-14,17- or 14,17a-dione, 3-hydroxy or substituted oxy-13-lower alkylgona- or D-homogona-1,3,5(10),8,14-pentaene-14,17- or 14,17a-dione, 3-hydroxy or substituted oxy-13-lower alkyl-15-carbalkoxy, carbaralkoxy or carboxamido-1,3,5(10),8,14-pentaen-17-one (Compound IV) or a 3-hydroxy or substituted oxy-13-lower alkylgona-1,3,5(10),9(11),8(14),15-hexaen-17-one (Compound V).

The condensation of Compound I with a 2-lower alkyl-4-acyloxycyclopentane-1,3-dione provides a 3-hydroxy or substituted oxy-8,14-seco-13-lower alkylgona-1,3,5(10),9-(11),15-pentaene-14,17-dione and the one-step method for the condensation of these reactants provides a 3-hydroxy or substituted oxy-13-lower alkylgona-1,3,5(10),9(11),8-(14),15-hexaen-17-one.

Heretofore, the condensation of a 1-vinyl-1-hydroxy-6-hydroxy or substituted oxy-1,2,3,4-tetrahydronaphthalene with a cycloaliphatic-1,3-dione has been considered a base catalyzed reaction and has been conducted in the presence of a base, such as potassium hydroxide or benzyl trimethylammonium hydroxide. The condensation as heretofore carried out has provided a relatively low yield of the desired 3-hydroxy or substituted oxy-8,14-seco-13-lower alkylgona - 1,3,5(10),9(11)-tetraene-14,17-dione condensation product. One investigator stated that the condensation did not take place in the presence of acidic catalysts.

It has now been discovered that the condensation of Compound I with Compound II proceeds readily if the reaction mixture is acidic, preferably at a pH of from about 3 to about 6, and provides a high yield of the condensation product. An additional advantage of conducting the condensation under acid conditions is that a 2-lower alkyl-4-carbalkoxy, carbaralkoxy or carboxamidocyclopentane-1,3-dione may be reacted with Compound I to provide a 3-hydroxy or substituted oxy-8,14-secogona-13-lower alkyl-1,3,5(10),9(11)-tetraene-15-carbalkoxy, carbaralkoxy or carboxamido-14,17-dione condensation product. If this reaction is conducted under basic conditions a carbalkoxy, carbaralkoxy or carboxamido substitutent may undergo partial saponification to the free acid and some decarboxylation may then take place.

It has also been discovered that by the use of a lower aliphatic acid, as an ingredient in the reaction mixture, preferably acetic acid, with or without the presence of a hydrocarbon, such as benzene, toluene or xylene, as a solvent, the condensation of Compound I and Compound II proceeds in one step and in good yields through Compound III to Compounds IV and V which result from ring closure and loss of one molecule of water from the Compound III condensation products. By the one-step condensation, improved yields of Compounds IV and V are obtained at substantially lower costs because of savings in time and materials.

It has been additionally discovered that Compound II provides an acidic reaction mixture having a pH within the range of 3 to 6 so that the condensation thereof with Compound I may be conducted in the absence of additional acid and with or without a solvent to provide excellent yields of Compound III.

The novel method of this invention may be schematically represented as follows:

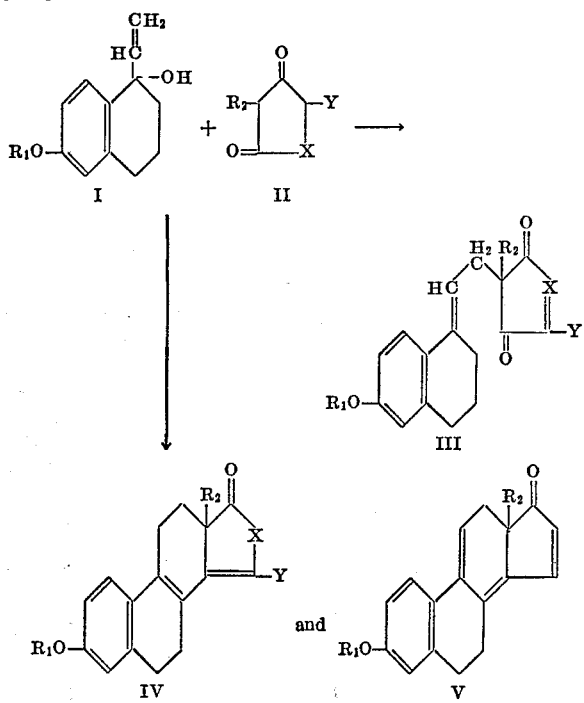

wherein R₁ is hydrogen, a lower alkyl, or alicyclic substituent, preferably having not more than five carbon atoms, an aryl, alkaryl, aralkyl substituent, or a heterocyclic substituent, such as tetrahydropyranyl; R₂ is hydrogen or a lower alkyl substituent, preferably having not more than five carbon atoms; X is methylene or ethylene; the dotted line between the C–15 and C–16 carbon atoms of Formula III indicates that bond is a single bond when X is ethylene and a single or double bond when X is methylene; Y is hydrogen when R₂ is hydrogen, Y is hydrogen when the bond between the C–15 and C–16 carbon atoms is a double bond, and Y is hydrogen when X is ethylene; when R₂ is lower alkyl and X is methylene, Y in Formula II is hydrogen, a carboxamido substituent, or a carbalkoxy or carbaralkoxy substituent of the formula:

in which R₃ is a lower alkoxy substituent, or an aralkoxy substituent in which the alkyl portion is lower alkyl, preferably having not more than five carbon atoms, or an acyloxy substituent of the formula:

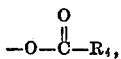

in which R₄ is a lower alkyl substituent, preferably having not more than five carbon atoms; and when R₂ is lower alkyl, X is methylene, and the bond between the C–15 and C–16 carbon atoms is a single bond, Y in Formulas III and IV is hydrogen, a carboxamido substituent, or a carbalkoxy or carbaralkoxy substituent of the formula:

in which R₃ is a lower alkoxy or aralkoxy substituent in which the alkyl portion is lower alkyl, preferably having not more than five carbon atoms.

The condensation of Compound I with Compound II to provide Compound III is conveniently conducted by reacting under acidic conditions, preferably at a pH within the range of from about 3 to about 6, substantially equimolar amounts of Compound I and Compound II in a polar solvent, such as methanol, ethanol, tertiary-butanol, or a mixed solvent such as methanol, ethanol or tertiary-butanol and an aromatic hydrocarbon, such as benzene, toluene or xylene, at a temperature within the range of from about room temperature to 140° C. Acidic conditions may be obtained by the addition to the reaction mixture of a lower aliphatic acid, preferably acetic acid. The appropriate acidic conditions are also obtained by using an excess of Compound II in the absence of an aliphatic acid. The condensation product may be conveniently separated by cooling the reaction mixture, concentrating under vacuum, adding a non-polar organic solvent, such as ether, to precipitate unreacted cycloaliphatic-1,3-dione, removing the unreacted cycloaliphatic-1,3-dione by filtration, washing the precipitate with ether, combining the ether wash with the original filtrate, washing the combined ether solution with an aqueous solution of a weak base, such as potassium bicarbonate, drying the ether solution, and concentrating the ether solution to dryness, preferably under vacuum, to give Compound III, which may be purified, if desired, by crystallization from a suitable solvent, such as an ether-hexane mixture.

The one-step condensation of Compound I with Compound II, in which Compound III is formed but as formed undergoes ring closure and loss of one molecule of water, to provide Compound IV and Compound V, may be conveniently accomplished by refluxing a solution of substantially equimolar amounts of the two reactants and an organic acid such as acetic acid or propionic acid in an inert solvent such as xylene, benzene, or dioxane. The reaction is preferably conducted in an inert atmosphere, such as an atmosphere of nitrogen. To isolate the reaction product the solution is cooled and filtered to remove any precipitated unreacted reactants. The precipitated unreacted reactant is washed with ether and the ether wash is combined with the filtrate. The combined solution is washed with an aqueous solution of a weak alkali, such as potassium bicarbonate, and the washed solution is dried and evaporated to dryness. The resulting product may be purified, if desired, by crystallization from a suitable solvent, such as ether-petroleum ether.

The C-ring of Compound III may be conveniently closed with the elimination of one molecule of water by keeping a solution of any such compound in formic acid at a temperature of from 15° C. to about 30° C., or by heating a solution of the compound in an inert solvent, such as benzene, in the presence of para-toluenesulfonic acid at a temperature of about 60° C. The solution is then cooled, washed with a basic solution such as an aqueous sodium carbonate solution, and filtered. The solvent is removed by distillation and the product may be purified, if desired by recrystallization from a suitable solvent, such as ethyl acetate or methanol. If Compound III is a 3-hydroxy or substituted oxy-8,14-secogona- or D-homogona-1,3,5(10),9(11)-tetraene-14,17- or 14,17a-dione, a 3-hydroxy or substituted oxy-13-lower alkyl-8,14-secogona- or D-homogona-1,3,5(10),9(11)-tetraene-14, 17- or 14,17a-dione, or a 3-hydroxy or substituted oxy-13-lower alkyl-8,14-secogona-1,3,5(10),9(11) - tetraene-15-carbalkoxy, carbaralkoxy or carboxamido-14,17-dione, the reaction product is a 3-hydroxy or substituted oxy-gona- or D-homogona-1,3,5(10),8,14-pentaen-17- or 17a-one which may have a lower alkyl substituent on the 13-position, or a 3-hydroxy or substituted oxy-13-lower alkyl-15-carboxy, carbalkoxy, carbaralkoxy or carboxamido-gona-1,3,5(10),8,14-pentaen-17-one (Compound IV). If Compound III is a 3-hydroxy or substituted oxy-13-lower alkylgona-1,3,5(10),9(11),15 - pentaene-14,17-dione, the reaction product is a 3-hydroxy or substituted oxy-13-lower alkyl-1,3,5(10),9(11),8(14),15-gonahexaen-17-one (Compound V).

Compound IV may be selectively hydrogenated at the Δ¹⁴-double bond to provide the corresponding 1,3,5(10), 8-tetraene with a hydrogen atom on the C–14 carbon atom in the alpha-position, more particularly, a 3-hydroxy or substituted oxy-1,3,5(10),8-gona- or D-homo-gonatetraen-17- or 17a-one, which may have a lower alkyl substituent on the C–13 carbon atom, or a 3-hydroxy or substituted oxy-13-lower alkyl-15-carboxy, carboxamido, carbalkoxy or carbaralkoxy-1,3,5(10),8-gonatetraen-17-one. Compound V may be selectively hydrogenated at the $\Delta^{8(14),9(11),15}$-double bonds to provide a 3-hydroxy or substituted oxy-13-lower alkylgona-1,3,5(10)-trien-17-one having hydrogen atoms on the C–8, C–9 and C–14 carbon atoms in the alpha-position.

Hydrogenation may be conveniently accomplished by shaking a solution of the compound in a solvent, such as benzene, toluene, xylene, ethanol, or ethyl acetate, containing a catalyst, such as 2% palladised calcium carbonate or palladised charcoal, at a temperature of from about room temperature to 40° C. and one atmosphere of hydrogen until the theoretical amount of hydrogen has been absorbed. The product from the hydrogenation of Compound IV or V may be isolated by filtering the reaction mixture and removing the solvent from the filtrate by distillation under reduced pressure and may be purified by crystallization of the residue from a suitable solvent, such as methanol.

Hydrogenation of Compound IV or Compound V, in which $R_1$ is benzyl or substituted benzyl or in which a carbaralkoxy substituent is present on the C–15 carbon atom and $R_3$ is benzyloxy or substituted benzyloxy, results in the formation of the corresponding 3-hydroxy or 15-carboxy compound which has been hydrogenated at the $\Delta^{14}$ or $\Delta^{8(14),9(11),15}$-double bonds.

A 3-hydroxy or substituted oxy-1,3,5(10),8-gona- or D-homogonatetraen-17- or 17a-one, which may have a lower alkyl substituent on the C–13 carbon atom, or a 3-hydroxy or substituted oxy-13-lower alkyl-15-carboxy, carboxamido, carbalkoxy or carbaralkoxy-1,3,5(10),8-gonatetraen-17-one may be selectively reduced at the $\Delta^8$-double bond by adding a solution thereof in a suitable solvent, such as dioxane, or tetrahydrofuran, to a solution of potassium in liquid ammonia, adding ammonium acetate and water, extracting with ether, drying the ether extract over magnesium sulfate, filtering and removing the solvent by distillation under reduced pressure, to provide a 3-hydroxy or substituted oxy-1,3,5(10)-gona- or D-homogonatrien-17β- or 17aβ-ol which may have a lower alkyl group on the C–13 carbon atom, or a 3-hydroxy or substituted oxy-13-lower alkyl-15-carboxy, carboxamido, carbalkoxy or carbaralkoxy-1,3,5(10)-gonatrien-17β-ol, having hydrogen atoms on the C–9 and C–13 carbon atoms in the alpha position and a hydrogen atom on the C–8 carbon atom in the beta-position.

The 17β- or 17aβ-hydroxy group of a 3-hydroxy or substituted oxy-1,3,5(10)-gona- or D-homogonatrien-17β- or 17aβ-ol, which may have a lower alkyl group on the C–13 carbon atom, or a 3-hydroxy or substituted oxy-13-lower alkyl-15-carboxamido, carbalkoxy or carbaralkoxy-1,3,5(10)-gonatrien-17β-ol may be oxidized to a 17- or 17a-keto group by the use of chromic acid as an oxidizing agent. Oxidation may be conveniently accomplished by adding a concentrated aqueous chromic acid solution, preferably about 8-normal, with stirring to a solution of the compound to be oxidized in acetone or other inert organic solvent containing anhydrous magnesium sulfate. After addition is complete, the mixture is stirred for a few minutes and an alcohol, such as isopropanol, and sodium hydrogen carbonate are added. The oxidation product may be isolated by filtering to remove the solvents from the reaction mixture and washing the material removed by filtration with hot chloroform. The chloroform is added to the filtrate and the solvents are removed from the resulting solution by distillation under reduced pressure. The residue is dissolved in ether and the ether solution is passed through a column of neutral alumina. The product is removed from the alumina by extraction with hot methanol and the oxidation product is obtained in crystalline form from the cooled methanol solution.

A 3-substituted oxy-1,3,5(10)-gona- or D-homogonatrien-17- or 17a-one compound, which may have a lower alkyl group on the C–13 carbon atoms, or 3-substituted oxy-13-lower alkyl-15-carboxamido, carbalkoxy or carbaralkoxy-1,3,5(10)-gonatrien-17-one, may be readily converted to the corresponding 3-hydroxy compound by known procedures, such as by treatment with pyridine hydrobromide at elevated temperatures.

A 3-hydroxy or substituted oxy-13-lower alkyl-1,3,5(10)-gonatrien-17-one having hydrogen atoms on the C–8, C–9 and C–14 carbon atoms in the alpha-position, obtained by hydrogention of Compound V, may be dehydrogenated to form a $\Delta^8$-double bond by refluxing a solution of that compound in a lower aliphatic alcohol, preferably tertiary-butanol, containing chloranil, under nitrogen. The reaction product may be conveniently isolated by filtering the reaction mixture, removing the aliphatic alcohol by distillation under reduced pressure and dissolving the residue in chloroform. The chloroform solution is allowed to stand overnight and then filtered to remove tetrahydroquinone. The resulting solution is washed repeatedly with water, dried over sodium sulfate, and the solvent is removed by distillation under reduced pressure. The residue is a 3-hydroxy or substituted oxy-13-lower alkyl-1,3,5(10),8-gonatetraen-17-one which has a hydrogen atom on the C–14 carbon atom in the alpha-position, and may be purified by dissolving in methanol, treating the methanol solution with charcoal, removing the charcoal by filtration and concentrating the methanol solution until crystallization occurs. Further purification may be accomplished by recrystallization from a suitable solvent, such as ethyl acetate.

A carbalkoxy, carbaralkoxy or carboxamido group of a 3-hydroxy or substituted oxy-13-lower alkyl-15-carbalkoxy, carbaralkoxy or carboxamido-1,3,5(10),8,14-gonapentaen-17-one, a 3-hydroxy or substituted oxy-13-lower alkyl-15-carboxamido, carbalkoxy or carbaralkoxy-1,3,5(10),8-gonatetraen-17-one, a 3-hydroxy or substituted oxy-13-lower alkyl-15-carboxamido, carbalkoxy or carbaralkoxy-1,3,5(10)-gonatrien-17β-ol, or a 3-hydroxy or substituted oxy-13-lower alkyl-15-carboxamido, carbalkoxy or carbaralkoxy-1,3,5(10)-gonatrien-17-one may be readily converted to a carboxy group by saponification with a weak base, such as barium hydroxide, saponification may be accomplished by refluxing under nitrogen a solution of the compound to be saponified in a lower aliphatic alcohol, preferably methanol or ethanol, which contains the weak base and as much water as can be present and still permit the compound to be saponified to be in solution. When the saponification is complete, the reaction mixture is cooled and an acid, such as hydrochloric acid, in an amount sufficient to react with all the base used in the reaction, is added. The reaction product is extracted from the reaction mixture with ether.

Any 15-carboxy compound obtained by saponification of a 15-carbalkoxy, carbaralkoxy or carboxamido compound as described above, may be resolved by combining with a suitable alkaloid base, such as brucine, strychnine, quinine or cinchonine, and separating the enantiamorphs according to conventional procedures, followed by converting the alkaloid base-steroid combination product into the free acid and free base, and separating and recovering the steroid from the alkaloid base.

Any 15-carboxy compound described above may be decarboxylated by warming a solution, preferably under nitrogen, of the 15-carboxy compound in a lower aliphatic acid, such as acetic acid, containing a small amount of an acid, such as hydrochloric acid. After decarboxylation is complete, water is added to the reaction mixture and the decarboxylated product may be recovered by extraction with a suitable solvent, such as ether.

2-lower alkyl-4-carbalkoxy or carbaralkoxycyclopentane-1,3-diones may be prepared by adding a basic condensation agent to a solution of a 2-lower alkyl-3-ketoadipic acid diester in an organic solvent, such as benzene, toluene, xylene, dimethylsulfoxide, cyclohexane or tetrahydrofuran, and allowing the reaction mixture to stand at room temperature, or by refluxing the solution. The basic condensation agent is an alkali metal hydride or alkoxide, more particularly, sodium hydride or potassium hydride, or a sodium or potassium alkoxide of a lower aliphatic alcohol, such as ethanol, propanol, isopropanol, or tertiary-butanol, sodium or potassium tertiary-butoxide being the preferred alkoxide because ester interchange is reduced to a minimum by the use of this alkoxide. The condensation agent may be in the form of a solution in a lower aliphatic alcohol and if the condensation agent is sodium or potassium alkoxide, preferably in solution in the corresponding aliphatic alcohol. The reaction is conducted at a temperature within the range of from about room temperature to the boiling point of the organic solvent present in the reaction mixture. It is preferred that the reaction mixture be refluxed for about two hours. The reaction product may be conveniently isolated by cooling the reaction to room temperature, concentrating to near dryness by distillation of the solvents under reduced pressure, adding sufficient water to the residue to decompose any condensation agent present, extracting the mixture with ether, separating and acidifying the aqueous phase with 1 N hydrochloric acid, and extracting the aqueous phase with ether. The latter ether extract may be washed with saturated sodium chloride solution, dried over magnesium sulfate, and concentrated to dryness under reduced pressure. The residue comprises the 2-lower alkyl-4-carbalkoxy or carbaralkoxycyclopentane-1,3-dione and may be crystallized from a suitable solvent or solvent mixture, such as an ether-hexane mixture.

A 2-lower alkyl-4-carbalkoxy or carbaralkoxycyclopentane-1,3-dione may be converted to a 2-lower alkyl-4-carboxamidocyclopentane-1,3-dione by treatment of a solution of the compound in an organic solvent with ammonia, for example, a solution of the 2-lower alkyl-4-carbalkoxy or carbaralkoxycyclopentane-1,3-dione in a lower aliphatic alcohol, such as ethanol, is treated with ammonia at an elevated temperature. This is conveniently accomplished by saturating an alcohol solution of the 2-lower alkyl-4-carbalkoxy or carbaralkoxycyclopentane-1,3-dione in a lower aliphatic alcohol with gaseous ammonia and heating the resulting solution in a sealed tube for a period of about four hours, cooling the reaction mixture to room temperature, and removing the solvent and ammonia by distillation under reduced pressure. The residue is a 2-lower alkyl-4-carboxamidocyclopentane-1,3-dione and may be recrystallized from a solvent, such as an acetone-water solution.

2-lower alkyl-4-lower acyloxycyclopentane-1,3-diones may be prepared by the acylation of a 2-lower alkyl-4-hydroxycyclopentane-1,3-dione with a lower aliphatic acid anhydride by dissolving a 2-lower alkyl-4-hydroxycyclopentane-1,3-dione in an aliphatic acid anhydride and pyridine and keeping the reaction mixture at room temperature for about 18 hours. The residue is then concentrated to dryness under reduced pressure and the residue is dissolved in an aqueous solution of the aliphatic acid corresponding to the acid anhydride. This solution is heated on the steam bath for about 90 minutes and then the solvent is removed by distillation under reduced pressure. The reaction product may be isolated by triturating the residue with benzene-chloroform solvent mixture and filtering to remove the insoluble substances. The filtrate is concentrated to dryness by distillation under reduced pressure and the residue is triturated with ether. The ether insoluble residue is the desired 2-lower alkyl-4-lower acyloxycyclopentane-1,3-dione.

2-lower alkyl-4-bromocyclopentane-1,3-diones may be conveniently prepared by adding a solution of bromine in acetic acid dropwise to a stirred solution of a 2-lower alkylcyclopentane-1,3-dione in acetic acid and stirring the solution for about two hours while the temperature is maintained at about room temperature. The reaction product may be isolated by removing the solvents by distillation under reduced pressure. The residue is substantially pure 2-lower alkyl-4-bromocyclopentane-1,3-dione.

The following examples illustrate methods of carrying out the present invention, but it is to be understood that these examples are given for purposes of illustration and not of limitation.

EXAMPLE 1

3-methoxy-8,14-seco-13-methyl-gona-1,3,5,(10), 9(11)-tetraene-14,17-dione

A mixture of 700 mg. of 1-vinyl-1-hydroxy-6-methoxy-1,2,3,4-tetrahydronaphthalene and 800 mg. of 2-methylcyclopentanedione-1,3 in four ml. of xylene and two ml. of tertiary-butanol is refluxed for 90 minutes. The mixture is cooled and concentrated to dryness under reduced pressure. Twenty ml. of ether are added to the residue and 115 mg. of insoluble 2-methylcyclopentanedione-1,3 are removed by filtration. The filtrate is washed with 5% aqueous sodium bicarbonate solution, dried over magnesium sulfate, and concentrated to dryness under reduced pressure. Crystallization of the residue from a solution of ether and hexane gives 515 mg. of 3-methoxy-8,14-seco - 13-methyl-gona - 1,3,5(10),9(11)-tetraene-14,17-dione, M.P. 76–78° C.

EXAMPLE 2

3-methoxy-8,14-seco-13-methyl-gona-1,3,5(10), 9(11)-tetraene-14,17-dione

A mixture of 700 mg. of 1-vinyl-1-hydroxy-6-methoxy-1,2,3,4-tetrahydronaphthalene and 800 mg. of 2-methylcyclopentanedione-1,3 in six ml. of tertiary-butanol is refluxed for eighteen hours. The mixture is cooled and concentrated to dryness under reduced pressure. Twenty ml. of ether are added and the insoluble 2-methylcyclopentanedione-1,3 is removed by filtration. The filtrate is washed with 5% aqueous sodium bicarbonate solution, dried over magnesium sulfate, and concentrated to dryness under reduced pressure. The residue is crystallized from a solution of ether and hexane. 495 mg. of 3-methoxy-8,14-seco - 13-methyl-gona - 1,3,5(10),9(11)-tetraene-14,17-dione, M.P. 76–78° C. are obtained.

EXAMPLE 3

3-methoxy-8,14-seco-13-ethyl-gona-1,3,5(10), 9(11)-tetraene-14,17-dione

A mixture of 610 mg. of 1-vinyl-1-hydroxy-6-methoxy-1,2,3,4-tetrahydronaphthalene and 380 mg. of 2-ethylcyclopentane-1,3-dione in four ml. of xylene and two ml. of ethanol is refluxed for three hours. The mixture is cooled and concentrated to dryness under reduced pressure. Twenty ml. of ether are added and the insoluble 2-ethylcyclopentane-1,3-dione is removed by filtration. The ether solution is washed with 5% aqueous sodium bicarbonate solution dried over magnesium sulfate, and concentrated to dryness under reduced pressure. The residue is 3-methoxy-8,14-seco-13-ethyl-gona-1,3,5(10), 9(11)-tetraene-14,17-dione and is crystallized from a solution of ether and hexane.

EXAMPLE 4

3-methoxy-8,14-seco-13-methyl-D-homogona-1,3, 5(10),9(11)-tetraene-14,17a-dione

A mixture of 600 mg. of 1-vinyl-1-hydroxy-6-methoxy-1,2,3,4-tetrahydronaphthalene and 375 mg. of 2-methylcyclohexanedione-1,3 in four ml. of xylene and two ml. of tertiary-butanol is refluxed for two hours. The mixture is cooled and concentrated to dryness under reduced pressure. Twenty ml. of ether are added and the insoluble 3-methyl-cyclohexanedione-1,3 is removed by filtration. The filtrate is washed with 5% aqueous sodium bicarbonate solution, dried over magnesium sulfate, and concentrated to dryness under reduced pressure. The residue is 3-methoxy-8,14 - seco-13 - methyl-D-homogona-1,3, 5(10),9(11)-tetraene-14,17a-dione and is crystallized from a solution of ether and hexane.

EXAMPLE 5

3-benzyloxy-8,14-seco-13-methyl-gona-1,3,5(10),
9(11)-tetraene-14,17-dione

A mixture of 560 mg. of 1-vinyl-1-hydroxy-6-benzyloxy-1,2,3,4-tetrahydronaphthalene and 225 mg. of 2-methylcyclopentanedione-1,3 in a mixture of three ml. of toluene and three ml. of ethanol is refluxed for six hours. The mixture is cooled and concentrated to dryness under reduced pressure. Twenty ml. of ether are added and the insoluble 2-methylcyclopentanedione-1,3 is removed by filtration. The filtrate is washed with 5% aqueous sodium bicarbonate solution, dried over magnesium sulfate, and concentrated to dryness under reduced pressure. Crystallization of the residue from a solution of ether and hexane gives 3-benzyloxy-8,14-seco-13-methyl-gona-1,3,5(10),9(11)-tetraene-14,17-dione.

EXAMPLE 6

3-hydroxy-8,14-seco-methyl-gona-1,3,5(10),9(11)-tetraene-14,17-dione

A mixture of 570 mg. of 1-vinyl-1,6-dihydroxy-1,2,3,4-tetrahydronaphthalene and 340 mg. of 2-methylcyclopentanedione-1,3 in four ml. of xylene and two ml. of tertiary-butanol is refluxed for two hours. The mixture is cooled and concentrated to dryness under reduced pressure. Twenty ml. of ether are added and the insoluble 2-methylcyclopentanedione-1,3 is removed by filtration. The filtrate is washed with 5% aqueous sodium bicarbonate solution, dried over magnesium sulfate and concentrated to dryness under reduced pressure. The residue is 3 - hydroxy-8,14-seco-13-methyl-gona-1,3,5(10),9(11)-tetraene-14,17-dione and is crystallized from a mixture of ether and hexane.

EXAMPLE 7

3-methoxy-8,14,-seco-13-methyl-15-carbomethoxy-gona-1,3,5(10),9(11)-tetraene-13,17-dione A mixture of 1.02 g. of 1-vinyl-1-hydroxy-6-methoxy-1,2,3,4-tetrahydronaphthalene and 850 mg. of 2-methyl-4-carbomethoxycyclopentanedione-1,3 in four ml. of xylene and two ml. of tertiary-butanol is allowed to stand with stirring at 25° C. for twenty hours. 30 ml. of ether are then added and the precipitated 2-methyl-4-carbomethoxy-cyclopentanedione-1,3 is removed by filtration. The filtrate is washed with 5% aqueous bicarbonate solution, dried over magnesium sulfate, and concentrated to dryness under reduced pressure. The residue is 3-methoxy-8,14-seco-13-methyl - 15 - carbomethoxy-gona-1,3,5(10),9(11)-tetraene-14,17-dione.

EXAMPLE 8

3-methoxy-8,14-seco-13-methyl-15-carbethoxy-gona-1,3,5(10),9(11)-tetraene-14,17-dione A mixture of 1.02 g. of 1-vinyl-1-hydroxy-6-methoxy-1,2,3,4-tetrahydronaphthalene and 850 mg. of 2-methyl-4-carbethoxycyclopentanedione-1,3 in four ml. of xylene and 3 ml. of tertiary-butanol is maintained at a temperature of 25° C. with stirring for twenty hours. 30 ml. of ether are then added and the precipitated 2-methyl-4-carbethoxycyclopentanedione-1,3 is removed by filtration. The filtrate is washed with 5% aqueous potassium bicarbonate solution, dried over magnesium sulfate, and concentrated to dryness under reduced pressure. The residue is 3-methoxy-8,14-seco-13-methyl - 15 - carbethoxy-gona-1,3,5(10),9(11)-tetraene-14,17-dione.

EXAMPLE 9

3-methoxy-8,14-seco-13-methyl-gona-1,3,5(10),
9(11)-tetraene-14,17-dione

A mixture of 500 mg. of 1-vinyl-1-hydroxy-6-methoxy-1,2,3,4-tetrahydronaphthalene and 280 mg. of 2-methyl-cyclopentanedione-1,3 in three ml. of xylene and 1.5 ml. of acetic acid is refluxed for ten minutes. The reaction mixture is cooled and twenty ml. of ether are added. The precipitated 2-methylcyclopentanedione-1,3 is removed by filtration. The filtrate is washed with 5% aqueous potassium bicarbonate solution, dried over magnesium sulfate and evaporated to dryness under reduced pressure. The residue is 3-methoxy-8,14-seco-13-methyl-gona-1,3,5(10),9(11)-tetraene-14,17-dione, which is recrystallized from a mixture of ether and hexane.

EXAMPLE 10

3-methoxy-13-methyl-gona-1,3,5(10),
8,14-pentaen-17-one

A mixture of 500 mg. of 1-vinyl-1-hydroxy-6-methoxy-1,2,3,4-tetrahydronaphthalene and 280 mg. of 2-methyl-cyclopentanedione-1,3 in three ml. of xylene and 1.5 ml. of acetic acid is refluxed for two hours. The reaction mixture is cooled and 20 ml. of ether are added. The precipitated 2-methylcyclopentanedione-1,3 is removed by filtration. The filtrate is washed with 5% aqueous potassium bicarbonate solution, dried over magnesium sulfate and evaporated to dryness under reduced pressure. The residue is 3-methoxy-13-methyl-gona-1,3,5(10),8,14-pentaen-17-one and is recrystallized from a mixture of ether and hexane. The recrystallized product has a M.P. of 108–110° C.

EXAMPLE 11

3-methoxy-13-methyl-gona-1,3,5,(10),
8,14-pentaen-17-one

A mixture of 500 mg. of 1-vinyl-1-hydroxy-6-methoxy-1,2,3,4-tetrahydronaphthalene and 280 mg. of 2-methyl-cyclopentanedione-1,3 in three ml. of benzene and 1.5 ml. of acetic acid is refluxed for nine hours. The mixture is cooled to room temperature and 20 ml. of ether are added. The precipitated 2-methyl-cyclopentanedione-1,3 is removed by filtration. The filtrate is washed with 5% aqueous potassium bicarbonate solution, dried over magnesium sulfate, and concentrated to dryness under reduced pressure. The residue is 3-methoxy-13-methyl-gona-1,3,5(10),8,14-pentaen-17-one and is recrystallized from a mixture of ether and hexane.

EXAMPLE 12

3-methoxy-13-methyl-15-carbomethoxy - gona-1,3,5(10), 8,14-pentaen-17-one and 3-methoxy-13-methyl - gona-1,3,5(10),8,14-pentaen-17-one A mixture of 306 mg. of 1-vinyl-1-hydroxy-6-methoxy-1,2,3,4-tetrahydronaphthalene and 255 mg. of 2-methyl-4-carbomethoxycyclopentanedione-1,3 to two ml. of xylene and 1 ml. of acetic acid is refluxed for two hours. The reaction mixture is cooled to room temperature and 20 ml. of ether are added. The precipitated 2-methyl-4-carbomethoxycyclopentanedione-1,3 is removed by filtration. The filtrate is washed with 5% aqueous potassium bicarbonate solution, dried over magnesium sulfate, and concentrated to dryness under reduced pressure. The residue is a mixture of 3-methoxy-13-methyl-15-carbomethoxy-gona - 1,3,5(10),8,14 - pentaen-17-one and 3-methoxy-13-methyl-gona-1,3,5(10),8,14-pentaen-17-one. The two reaction products are separated by chromatography on florisil.

EXAMPLE 13

3-methoxy-8,14-seco-13-methyl-D-homogona-1,3,
5(10),9(11)tetraene-14,17a-dione

A mixture of 510 mg. of 1-vinyl-1-hydroxy-6-methoxy - 1,2,3,4 - tetrahydronaphthalene and 315 mg. of 2-methyl-cyclohexanedione-1,3 in three ml. of xylene and 1.5 ml. of acetic acid is refluxed for ten minutes. The reaction mixture is cooled to room temperature and 20 ml. of ether are added. The precipitated 2-methylcyclohexanedione - 1,3 is removed by filtration. The filtrate is washed with 5% aqueous potassium bicarbonate, dried over magnesium sulfate, and concentrated to dryness under reduced pressure. The residue is 3-methoxy-8,14- seco - 13 - methyl - D - homogona - 1,3,5(10),9(11)-tetraene-13,17a-dione.

EXAMPLE 14

3-methoxy-13-methyl-D-homogona-1,3,5(10), 8,14-pentaen-17a-one

A mixture of 510 mg. of 1-vinyl-1-hydroxy-6-methoxy-1,2,3,4 - tetrahydronaphthalene and 315 mg. of 2-methyl-cyclohexanedione-1,3 in three ml. of xylene and 1.5 ml. of acetic acid is refluxed for seven hours. The reaction mixture is cooled to room temperature and 20 ml. of ether are added. The precipitated 2-methylcyclohexane-dione-1,3 is removed by filtration. The filtrate is washed with 5% aqueous potassium bicarbonate solution, dried over magnesium sulfate, and evaporated to dryness under reduced pressure. The residue is 3-methoxy-13-methyl-D-homogona-1,3,5(10),8,14-pentaen-17a-one.

EXAMPLE 15

3-methoxy-13-ethyl-gona-1,3,5(10),8,14-pentaen-17-one

A mixture of 500 mg. of 1-vinyl-1-hydroxy-6-methoxy-1,2,3,4 - tetrahydronaphthalene and 310 mg. of 2-ethyl-cyclopentanedione-1,3 in two ml. of xylene and two ml. of acetic acid is refluxed for three hours. The reaction mixture is cooled to room temperature and twenty ml. of ether are added. The precipitated 2-ethylcyclopentane-dione-1,3 is removed by filtration. The filtrate is washed with 5% aqueous potassium bicarbonate solution, dried over magnesium sulfate and concentrated to dryness under reduced pressure. The residue is 3-methoxy-13-ethyl-gona-1,3,5(10),8,14-pentaen-17-one.

EXAMPLE 16

3-hydroxy-13-methyl-gona-1,3,5(10),8,14-pentaen-17-one

A mixture of 570 mg. of 1-vinyl-1,6-dihydroxy-1,2,3,4-tetrahydronaphthalene and 340 mg. of 2-methylcyclo-pentanedione-1,3 in four ml. of xylene and two ml. of acetic acid is refluxed for 90 minutes. The reaction mixture is cooled to room temperature and twenty ml. of ether are added. The precipitated 2-methylcyclopentane-dione-1,3 is removed by filtration. The filtrate is washed with 5% aqueous potassium bicarbonate solution, dried over magnesium sulfate and concentrated to dryness under reduced pressure. The residue is 3 - hydroxy-13-methyl-gona-1,3,5(10),8,14-pentaen-17-one.

EXAMPLE 17

3-methoxy-8,14-seco-13-methyl-15-carboxamido-gona-1,3,5(10),9(11)-tetraene-14,17-dione A mixture of 500 mg. of 1-vinyl-1-hydroxy-6-methoxy-1,2,3,4 - tetrahydronaphthalene and 380 mg. of 2-methyl-4 - carboxamidocyclopentanedione - 1,3 in four ml. of tertiary-butanol is refluxed for two hours. The mixture is cooled and concentrated to dryness under reduced pressure. Twenty ml. of ether are added and the insoluble 2 - methyl - 4 - carboxamidocyclopentanedione - 1,3 is removed by filtration. The filtrate is washed with 5% aqueous sodium bicarbonate solution, dried over magnesium sulfate, and concentrated to dryness under reduced pressure. The residue is 3-methoxy-8,14-seco-13-methyl - 15 - carboxamido - gona - 1,3,5(10),9(11)-tetraene-14,17-dione.

EXAMPLE 18

3-methoxy-13-methyl-15-carboxamido-gona-1,3,5(10), 8,14-pentaen-17-one

A solution of 500 mg. of 1-vinyl-1-hydroxy-6-methoxy-1,2,3,4 - tetrahydronaphthalene and 380 mg. of 2-methyl-4 - carboxamidocyclopentanedione - 1,3 in four ml. of xylene and two ml. of acetic acid is refluxed for 90 minutes. The reaction mixture is cooled to room temperature and 20 ml. of ether are added. The precipitated 2-methyl-4 - carboxamidocyclopentanedione - 1,3 is removed by filtration. The filtrate is washed with 5% aqueous potassium bicarbonate solution, dried over magnesium sulfate, and concentrated to dryness under reduced pressure. The residue is 3 - methoxy - 13 - methyl - 15 - carboxamido-gona-1,3,5(10),8,14-pentaen-17-one.

EXAMPLE 19

3-methoxy-8,14-seco-13-methyl-gona-1,3,5(10),9(11)-tetraene-14,17-dione

A mixture of 350 mg. of 1-vinyl-1-hydroxy-6-methoxy-1,2,3,4 - tetrahydronaphthalene and 300 mg. of 2-methyl-cyclopentanedione-1,3 in six ml. of dioxane is refluxed for eight hours. The mixture is cooled and concentrated to dryness under reduced pressure. Twenty ml. of ether are added to the residue and the insoluble 2-methylcyclo-pentanedione-1,3 is removed by filtration. The filtrate is washed with 5% aqueous sodium bicarbonate solution, dried over magnesium sulfate, and concentrated to dryness under reduced pressure. The residue is 3-methoxy-8,14 - seco - 13 - methyl - gona - 1,3,5(10),9(11)-tetraene-14,17-dione and is crystallized from a mixture of ether and hexane.

EXAMPLE 20

3-methoxy-8,14-seco-13-methyl-gona-1,3,5(10),9(11)-tetraene-14,17-dione

A mixture of 500 mg. of 1-vinyl-1-hydroxy-6-methoxy-1,2,3,4-tetrahydronaphthalene and 300 mg. of 2-methyl-cyclopentanedione-1,3 is heated to 130° C. and maintained at that temperature for 60 minutes. The mixture is cooled to room temperature and 20 ml. of ether are added. The insoluble 2 - methylcyclopentanedione-1,3 is removed by filtration, the filtrate is washed with 5% aqueous potassium bicarbonate solution, dried over magnesium sulfate and concentrated to dryness under reduced pressure. The residue is 3-methoxy-8,14-seco-13-methyl-gona-1,3,5(10),9(11)-tetraene-14,17-dione and is crystallized from a mixture of ether and hexane.

EXAMPLE 21

3-methoxy-8,14-seco-gona-1,3,5(10),9(11)-tetraene-14,17-dione

A mixture of 500 mg. of 1-vinyl-1-hydroxy-6-methoxy-1,2,3,4-tetrahydronaphthalene and 400 mg. of cyclopen-tanedione-1,3 in three ml. of xylene and 1.5 ml. of tertiary-butanol is refluxed for 90 minutes. The mixture is cooled to room temperature and 20 ml. of ether are added. The precipitated cyclopentanedione-1,3 is removed by filtration. The filtrate is washed with saturated aqueous sodium chloride solution, dried over magnesium sulfate, and concentrated to dryness under reduced pressure. The residue is 3-methoxy-8,14-seco-gona-1,3,5(10),9(11)-tetraene-14,17-dione.

EXAMPLE 22

3-methoxy-gona-1,3,5(10),8,14-pentaen-17-one

A mixture of 500 mg. of 1-vinyl-1-hydroxy-6-methoxy-1,2,3,4-tetrahydronaphthalene and 400 mg. of cyclopen-tanedione-1,3 in three ml. of xylene and 1.5 ml. of acetic acid is refluxed for two hours. The reaction mixture is cooled to room temperature and extracted with 20 ml. of ether. The precipitate of cyclopentanedione - 1,3 is removed by filtration. The filtrate is washed with 5% aqueous potassium bicarbonate solution, dried over magnesium sulfate, and concentrated to dryness under reduced pressure. The residue is 3-methoxy-gona-1,3,5(10),8,14-pentaen-17-one.

EXAMPLE 23

3-phenoxy-8,14-seco-13-ethyl-gona-1,3,5(10),9(11)-tetraene 14,17-dione

A mixture of 700 mg. of 1-vinyl-1-hydroxy-6-phenoxy-1,2,3,4 - tetrahydronaphthalene and 800 mg. of 2-ethylcyclopentanedione-1,3 in four ml. of xylene and two ml. of tertiary-butanol is refluxed for 90 minutes. The mixture is cooled and concentrated to dryness under reduced pressure. Twenty ml. of ether are added to the residue and 115 mg. of insoluble 2-ethylcyclopentanedione-1,3 are removed by filtration. The filtrate is washed with 5% aqueous sodium bicarbonate solution, dried over magnesium sulfate, and concentrated to dryness under reduced pressure. Crystallization of the residue from a solution of ether and hexane gives 3-phenoxy-8,14-seco-13-ethyl-gona-1,3,5(10),9(11)-tetraene-14,17-dione.

EXAMPLE 24

3-tetrahydropyranyloxy-8,14-seco-13-isopropyl-gona-1,3,5(10),9(11)-tetraene-14,17-dione A mixture of 700 mg. of 1-vinyl-1-hydroxy-6-tetrahydropyranyloxy-1,2,3,4-tetrahydronaphthalene and 800 mg. of 2-isopropylcyclopentanedione-1,3 in six ml. of tertiary-butanol is refluxed for eighteen hours. The mixture is cooled and concentrated to dryness under reduced pressure. Twenty ml. of ether are added and the insoluble 2-isopropylcyclopentanedione-1,3 is removed by filtration. The filtrate is washed with 5% aqueous sodium bicarbonate solution, dried over magnesium sulfate, and concentrated to dryness under reduced pressure. The residue is 3 - tetrahydropyranyloxy-8,14-seco-13-isopropyl-gona-1,3,5(10),9(11)-tetraene-14,17-dione and is crystallized from a solution of ether and hexane.

EXAMPLE 25

3-cyclohexyloxy-8,14-seco-13-ethyl-gona-1,3,5(10),9(11)-tetraene 14,17-dione

A mixture of 610 mg. of 1-vinyl-1-hydroxy-6-cyclohexyloxy-1,2,3,4-tetrahydronaphthalene and 380 mg. of 2-ethylcyclopentane-1,3-dione in four ml. of xylene and two ml. of ethanol is refluxed for three hours. The mixture is cooled and concentrated to dryness under reduced pressure. Twenty ml. of ether are added and the insoluble 2-ethylcyclopentane-1,3-dione is removed by filtration. The ether solution is washed with 5% aqueous sodium bicarbonate solution, dried over magnesium sulfate, and concentrated to dryness under reduced pressure. The residue is 3-cyclohexyloxy - 8,14-seco-13-ethyl-gona-1,3,5(10),9(11)-tetraene-14,17-dione and is crystallized from a solution of ether and hexane.

EXAMPLE 26

3-isopropoxy-8,14-seco-13-ethyl-D-homogona-1,3,5(10),9(11)-tetraene-14,17a-dione A mixture of 600 mg. of 1-vinyl-1-hydroxy-6-isopropoxy - 1,2,3,4-tetrahydronaphthalene and 375 mg. of 2-ethylcyclohexanedione-1,3 in four ml. of xylene and two ml. of tertiary-butanol is refluxed for two hours. The mixture is cooled and concentrated to dryness under reduced pressure. Twenty ml. of ether are added and the insoluble 3-ethyl-cyclohexanedione-1,3 is removed by filtration. The filtrate is washed with 5% aqueous sodium bicarbonate solution, dried over magnesium sulfate, and concentrated to dryness under reduced pressure. The residue is 3-isopropoxy - 8,14 - seco - 13-ethyl-D-homogona-1,3,5(10),9(11)-tetraene-14,17a-dione and is crystallized from a solution of ether and hexane.

EXAMPLE 27

3-ethoxy-8,14-seco - 13 - methyl-15-carboxyamido-gona-1,3,5(10),9(11)-tetraene-14,17-dione A mixture of 1.02 g. of 1-vinyl-1-hydroxy-6-ethoxy-1,2,3,4-tetrahydronaphthalene and 850 mg. of 2-methyl-4-carboxamidocyclopentanedione-1,3 in four ml. of xylene and two ml. of tertiary-butanol is allowed to stand with stirring at 25° C. for twenty hours. 30 ml. of ether are then added and the precipitated 2-ethoxy-4-carboxamido-cyclopentanedione-1,3 is removed by filtration. The filtrate is washed with 5% aqueous bicarbonate solution, dried over magnesium sulfate, and concentrated to dryness under reduced pressure. The residue is 3-ethoxy-8,14-seco-13-methyl - 15 - carboximido-gona-1,3,5(10),9(11)-tetraene-14,17-dione.

EXAMPLE 28

3-ethoxy-8,14-seco-13-isopropyl-gona-1,3,5(10),9(11)-tetraene-14,17-dione

A mixture of 500 mg. of 1-vinyl-1-hydroxy-6-ethoxy-1,2,3,4-tetrahydronaphthalene and 280 mg. of 2-isopropylcyclopentanedione-1,3 in three ml. of xylene and 1.5 ml. of acetic acid is refluxed for ten minutes. The reaction mixture is cooled and twenty ml. of ether are added. The precipitated 2-isopropylcyclopentanedione-1,3 is removed by filtration. The filtrate is washed with 5% aqueous potassium bicarbonate solution, dried over magnesium sulfate and evaporated to dryness under reduced pressure. The residue is 3-ethoxy-8,14-seco-13-isopropyl-gona-1,3,5(10),9(11)-tetraene-14,17-dione, which is recrystallized from a mixture of ether and hexane.

EXAMPLE 29

3-butoxy-8,14-seco-13-ethyl-D-homogona-1,3,5(10),9(11)-tetraene-14,17a-dione

A mixture of 510 mg. of 1-vinyl-1-hydroxy-6-butoxy-1,2,3,4-tetrahydronaphthalene and 315 mg. of 2-ethyl-cyclohexanedione-1,3 in three ml. of xylene and 1.5 ml. of acetic acid is refluxed for ten minutes. The reaction mixture is cooled to room temperature and 20 ml. of ether are added. The precipitated 2-ethylcyclohexanedione-1,3 is removed by filtration. The filtrate is washed with 5% aqueous potassium bicarbonate, dried over magnesium sulfate, and concentrated to dryness under reduced pressure. The residue is 3-butoxy-8,14-seco-13-ethyl-D-homogona-1,3,5(10),9(11)-tetraene-14,17a-dione.

EXAMPLE 30

3-phenoxy-13-ethyl-D-homogona-1,3,5(10),8,14-pentaen-17a-one

A mixture of 510 mg. of 1-vinyl-1-hydroxy-6-phenoxy-1,2,3,4-tetrahydronaphthalene and 315 mg. of 2-ethylcyclohexanedione-1,3 in three ml. of xylene and 1.5 ml. of acetic acid is refluxed for seven hours. The reaction mixture is cooled to room temperature and 20 ml. of ether are added. The precipitated 2-ethylcyclohexanedione-1,3 is removed by filtration. The filtrate is washed with 5% aqueous potassium bicarbonate solution, dried over magnesium sulfate, and evaporated to dryness under reduced pressure. The residue is 3-phenoxy-13-ethyl-D-homogona-1,3,5(10),8,14-pentaen-17a-one.

EXAMPLE 31

3-ethoxy-8,14-seco-13-ethyl-15-carbethoxy-gona-1,3,5(10),9(11)-tetraene-14,17-dione A mixture of 500 mg. of 1-vinyl-1-hydroxy - 6-ethoxy-1,2,3,4-tetrahydronaphthalene and 380 mg. of 2-ethyl-4-carbethoxycyclopentanedione-1,3 in four ml. of tertiary-butanol is refluxed for two hours. The mixture is cooled and concentrated to dryness under reduced pressure. Twenty ml. of ether are added and the insoluble 2-ethyl-4-carbethoxycyclopentanedione-1,3 is removed by filtration. The filtrate is washed with 5% aqueous sodium bicarbonate solution, dried over magnesium sulfate, and concentrated to dryness under reduced pressure. The residue is 3 - ethoxy-8,14-seco-13-ethyl-15-carbethoxy-gona-1,3,5(10),9(11)-tetraene-14,17-dione.

EXAMPLE 32

3-ethoxy-13-ethyl-15-carbethoxy-gona-1,3,5(10),8,14-pentaen-17-one

A solution of 500 mg. of 1-vinyl-1-hydroxy-6-ethoxy-1,2,3,4-tetrahydronaphthalene and 380 mg. of 2-ethyl-4-carbethoxycyclopentanedione-1,3 in four ml. of xylene and two ml. of acetic acid is refluxed for 90 minutes. The reaction mixture is cooled to room temperature and 20 ml. of ether are added. The precipitated 2-ethyl-4-carbethoxy-cyclopentanedione-1,3 is removed by filtration. The filtrate is washed with 5% aqueous potassium bicarbonate solution, dried over magnesium sulfate, and concentrated to dryness under reduced pressure. The residue is 3-ethoxy-13-ethyl - 15 - carbethoxy-gona-1,3,5(10),8,14-pentaen-17-one.

Various changes and modifications may be made in carrying out the present invention without departing from the spirit and scope thereof. Insofar as these changes and modifications are within the purview of the annexed claims, they are to be considered a part of the invention.

What is claimed is:

1. A method for preparing, in a single process operation, a compound of the formula:

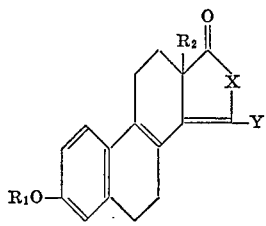

wherein $R_1$ is hydrogen, a lower alkyl, cycloaliphatic, aryl, alkaryl, aralkyl or heterocyclic substituent; $R_2$ is hydrogen or a lower alkyl substituent; X is methylene or ethylene; Y is hydrogen when $R_2$ is hydrogen, Y is hydrogen when X is ethylene, and Y is a carboxamido substituent, or a carbalkoxy or carb aralkoxy substituent of the formula:

in which $R_3$ is a lower alkoxy substituent, or an aralkoxy substituent in which the alkyl portion is lower alkyl, when $R_2$ is lower alkyl and X is methylene; which comprises heating in solution in an inert organic solvent at a pH of about 3 to 6, substantially equimolar amounts of a compound of the formula:

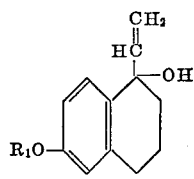

wherein $R_1$ has the same significance as above, with a compound of the formula:

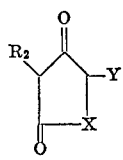

wherein $R_2$ and X have the same siginficance as above; Y is hydrogen when $R_2$ is hydrogen, Y is hydrogen when X is ethylene, and Y is a carboxamido substituent or a carbalkoxy or carbaralkoxy substituent of the formula:

in which $R_3$ is a lower alkoxy substituent or an aralkoxy substituent in which the alkyl portion is lower alkyl, when $R_2$ is lower alkyl and X is methylene.

2. A process according to claim 1 in which the said solution contains a lower aliphatic acid.

3. A process for preparing 3-methoxy-15-carbethoxy-estra-1,3,5(10),8,14-pentaen-17-one directly, in a single process operation starting with 2-methyl-4-carbethoxy-cyclopentane-1,3-dione, which comprises reacting, in solution at a pH of about 3 to 6, said 2-methyl-4-carbethoxy-cyclopentane-1,3-dione with 1-vinyl-1-hydroxy - 6 - methoxy-1,2,3,4-tetrahydronaphthalene.

4. A method for preparing, in a single process operation, a compound of the formula:

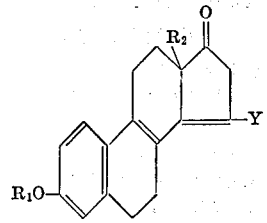

wherein $R_1$ is hydrogen, a lower alkyl, cycloaliphatic, aryl, alkaryl, aralkyl or heterocyclic substituent; $R_2$ is a lower alkyl substituent; and Y is a carboxamido substituent, or a carbalkoxy or carbaralkoxy substituent of the formula:

in which $R_3$ is a lower alkoxy substituent, or an aralkoxy substituent in which the alkyl portion is lower alkyl, when $R_2$ is lower alkyl; which comprises heating in solution in an inert organic solvent at pH of about 3 to 6, substantially equimolar amounts of a compound of the formula:

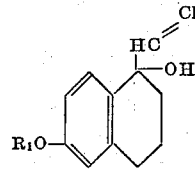

wherein $R_1$ has the same significance as above, with a compound of the formula:

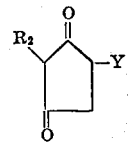

wherein $R_2$ and Y have the same significance as above.

5. A process according to claim 4 in which the said solution contains a lower aliphatic acid.

6. A process according to claim 2 in which the lower aliphatic acid is acetic acid.

7. A process according to claim 3 in which the said reaction is conducted in solution in a lower aliphatic acid.

8. A process according to claim 5 in which the lower aliphatic acid is acetic acid.

References Cited
UNITED STATES PATENTS 3,287,380  11/1966  Miki et al. _____ 260—497.45
3,300,484  1/1967   Pappo _____ 260—239.5

ELBERT L. ROBERTS, Primary Examiner

U.S. Cl. X.R.

260—397.45, 473, 558, 586